United States Patent
Danielius

(10) Patent No.: US 9,306,370 B2
(45) Date of Patent: Apr. 5, 2016

(54) REGENERATIVE OPTICAL AMPLIFIER FOR SHORT PULSED LASERS, A LASER SOURCE AND A LASER WORKSTATION

(71) Applicant: UAB MGF SVIESOS KONVERSIJA, Vilnius (LT)

(72) Inventor: Romualdas Danielius, Vilnius (LT)

(73) Assignee: UAB MGF SVIESOS KONVERSIJA (LT)

( * ) Notice: Subject to any disclaimer, the term of this patent is extended or adjusted under 35 U.S.C. 154(b) by 0 days.

(21) Appl. No.: 14/428,883

(22) PCT Filed: Mar. 13, 2013

(86) PCT No.: PCT/IB2013/051980
§ 371 (c)(1),
(2) Date: Mar. 17, 2015

(87) PCT Pub. No.: WO2014/041441
PCT Pub. Date: Mar. 20, 2014

(65) Prior Publication Data
US 2015/0288134 A1    Oct. 8, 2015

(30) Foreign Application Priority Data
Sep. 17, 2012  (LT) .................................... 2012 085

(51) Int. Cl.
*H01S 3/23* (2006.01)
*H01S 3/08* (2006.01)
(Continued)

(52) U.S. Cl.
CPC ............... *H01S 3/235* (2013.01); *H01S 3/0816* (2013.01); *H01S 3/08054* (2013.01);
(Continued)

(58) Field of Classification Search
CPC ................ H01S 3/235; H01S 3/10061; H01S 3/094076; H01S 3/117; H01S 3/107; H01S 3/0816; H01S 3/10023; H01S 3/08054; H01S 3/115
USPC ......................................... 372/12, 25–27, 30
See application file for complete search history.

(56) References Cited

U.S. PATENT DOCUMENTS

| 2004/0075892 A1 | 4/2004 | Tamaki et al. |
| 2011/0122483 A1 | 5/2011 | Lundquist et al. |

FOREIGN PATENT DOCUMENTS

| EP | 1801635 | 6/2007 |
| WO | 8606884 | 11/1986 |

(Continued)

*Primary Examiner* — Dung Nguyen
(74) *Attorney, Agent, or Firm* — Bryant J. Keller; Kirton McConkie, P.C.

(57) ABSTRACT

This invention provides a solution for operating a regenerative amplifier using a single electro-optical device, such as a Pockels cell. An efficient cavity geometry of a regenerative amplifier is provided for enabling pulse selection, coupling and releasing to an output by operating a single Pockels cell unit placed essentially in the middle of the optical cavity, between two polarizers, whereas a first polarizer is used for release of an amplified pulse and a second polarizer is used for injection of seed pulses and release of at least one of waste amplified pulses and seed pulses. One side of the cavity, with respect to the location of said Pockels cell, includes an empty space, whereas the other side is provided with a gain medium, which is pumped by a pump source. The regenerative amplifier of such optical design is both efficient and cost effective. The single electro-optical unit works both as the control unit for operating the regenerative amplifier and as an output pulse picker unit.

20 Claims, 2 Drawing Sheets

(51) Int. Cl.
H01S 3/081 (2006.01)
H01S 3/10 (2006.01)
H01S 3/107 (2006.01)
H01S 3/115 (2006.01)
H01S 3/094 (2006.01)
H01S 3/117 (2006.01)
H01S 3/0915 (2006.01)
H01S 3/00 (2006.01)

(52) U.S. Cl.
CPC .......... *H01S 3/094076* (2013.01); *H01S 3/107* (2013.01); *H01S 3/10023* (2013.01); *H01S 3/10061* (2013.01); *H01S 3/115* (2013.01); *H01S 3/117* (2013.01); *H01S 3/005* (2013.01); *H01S 3/0064* (2013.01); *H01S 3/0915* (2013.01); *H01S 3/1003* (2013.01)

(56) References Cited

FOREIGN PATENT DOCUMENTS

| | | |
|---|---|---|
| WO | 2005069963 | 8/2005 |
| WO | 2007065213 | 6/2007 |

REGENERATIVE OPTICAL AMPLIFIER FOR SHORT PULSED LASERS, A LASER SOURCE AND A LASER WORKSTATION

FIELD OF INVENTION

The invention relates to regenerative optical amplifiers comprising a cavity for amplifying short pulses of light and a voltage-driven electro-optical unit for controlling the operation of the optical amplifier.

BACKGROUND OF INVENTION

Regenerative amplifiers (RA) are used to amplify optical signals in order to increase pulse energy. Optical signals to be amplified are transmitted and locked inside regenerative amplifier by means of switching electro-optical elements, such as Pockels cells, driven by high voltage, typically in the kilovolt range. Said input optical signals are referred to as seed pulses.

The gain media inside RA is pumped by a light source, such as laser diodes or flash lamps. The pump radiation excites atoms inside the gain medium and passing seed pulses induce stimulated emission of radiation and thus are amplified.

In conventional RA designs, polarizing electro-optical elements, such as Pockels cells are arranged inside a resonator in order to act as polarization rotators or polarization state converters, whenever a seed pulse is to be locked inside RA cavity for amplification. Electro-optical elements are controlled by means of rapid voltage change. Absence of voltage means that the electro-optical element is not working, while application of voltage results in rotation or change of polarization state of a seed wave. Reverse operation is also possible, when inactive Pockels cell rotates the polarization and whenever it is activated by application of voltage, the resulting polarization of the optical field remains unchanged as compared to the polarization of the incident beam.

Another electro-optical or acousto-optical device is usually arranged on the output of the RA, in order to act as a pulse picker. It works in combination with a polarizer mirror and based on the resulting polarization of the optical field, amplified pulses are directed towards a laser output or towards a beam dump.

A US patent No. US2004075892, published on Apr. 22, 2004, describes a regenerative optical amplifier enabling voltage to be easily applied to polarizing elements such as Pockels cells, without the need for complicated drive circuitry. An input beam of S-polarized light is reflected by a polarizer and advances to a Pockels cell. During the time, which it takes for the input pulse, having once passed through the Pockels cell, to be reflected by a reflective mirror and return to the Pockels cell, a voltage causing a 90-degree rotation in the polarization of transmitted light is applied to the Pockels cell, and this applied voltage is maintained. The input beam is converted by the Pockels cell into a P-polarized light pulse which is transmitted by the polarizer. Subsequently, the light pulse is converted from P-polarized light to S-polarized light and back to P-polarized light with each round-trip of the Pockels cell, while passing each time between the reflective mirror, laser crystal and other reflective mirror, so as to be amplified in the resonator formed thereby. The amplified light pulse is extracted by applying a voltage VP2 causing a 90-degree rotation of the polarization of the transmitted light to the Pockels cell to convert the light pulse to S-polarized light which is then reflected out of the resonator by the polarizer.

A PCT application No. WO2005069963, published on Aug. 4, 2005 describes a regenerative amplifier system that is optimized for low-gain gain media is provided. The system is configured to include a minimum number of intra-cavity elements while still eliminating the leakage of the seed pulses from the output beam. In addition, the contrast ratio of the amplified pulses is increased even considering the long build-up time that is required in low-gain regenerative amplifiers. This is accomplished using a single Pockels cell between the oscillator and amplifier to select a single seed pulse for the cavity, instead of using a Faraday isolator. This directs the unwanted seed pulses in a separate direction from the output pulse. When the amplified pulse exits the cavity, it is directed in a direction away from the oscillator by the same Pockets cell. Only one additional Pockels cell and one polarizer are required inside the regenerative amplifier cavity.

An European patent, No. EP1801635, published on Jun. 27, 2007 describes a controllable Pockels cell system, which has a switching unit that can apply voltage to the Pockels cell. The Pockels cell system also features a delay unit that enables setting of a precise time when voltage is applied or removed from the Pockels cell. This allows displacing in time the voltage pulse applied to the Pockels cell, in this manner also displacing in time the transmission pulse of the Pockels cell with an analyzer located behind the Pockels cell. Thus it is possible to individually control the amplitude of selected laser pulses. The switching unit can either be a simple push-pull circuit or a bridge circuit made from two push-pull circuits.

Using several Pockels cells significantly increases the prime cost of the regenerative amplifier. Synchronization, simultaneous control of several electro-optical devices and monitoring makes the control electronics more complex. Extra heat is generated by the driving circuitry of the additional Pockels cell running at high repetition rates, which reduces the efficiency of the laser system.

Majority of prior art inventions and technical solutions use single optical path for input of the seed beam and output of the amplified beam. At some point in the optical pathway, outside the RA resonator, seed and amplified pulse beams are separated by means of a Pockels cell or a Faraday isolator. A drawback of such optical design is that some losses of the pulse energy occur, when the amplified pulse passes the Pockels cell on the output of the RA, as well as excess heat is generated in the crystal of the Pockels cell. Such layout is rather inefficient and might cause additional distortions of the beam or pulse shape.

SUMMARY

In order to eliminate the drawbacks indicated above, this invention provides a solution for operating a regenerative amplifier using single electro-optical device (2), such as Pockels cell. An efficient cavity geometry of a regenerative amplifier is provided for enabling pulse selection, locking and releasing to the output by operating a single Pockels cell unit placed essentially in the middle of the cavity. One side of the cavity, with respect to the location of said Pockels cell, is preferably an empty space, whereas the other side is provided with a gain medium, which is pumped by a pump source. In another embodiment, gain medium can be arranged in both optical paths (12, 13).

A seed pulse is injected into the optical resonator through a port, referred to as an input. An amplified pulse is released from the resonator via a separate port, referred to as an output. Pulses, which are not amplified, are always released from the cavity via the input port and directed to a beam dump by using a Faraday rotator or other optical switch. As a result, amplified output pulses do not have to pass excessive components, such as the Faraday Rotator, just an output polarizer, which results in less losses and distortions for the amplified pulse and less heat generated in the electro-optical unit (2) and additional components.

The regenerative amplifier of such optical design is both efficient and cost effective. The single electro-optical switching unit (2) works both as the control unit for operating the regenerative amplifier and as an output pulse picker unit.

DESCRIPTION OF DRAWINGS

In order to understand the invention better, and appreciate its practical applications, the following pictures are provided and referenced hereafter. Figures are given as examples only and in no way shall limit the scope of the invention.

DETAILED DESCRIPTION OF PREFERRED EMBODIMENTS

Figure 1:
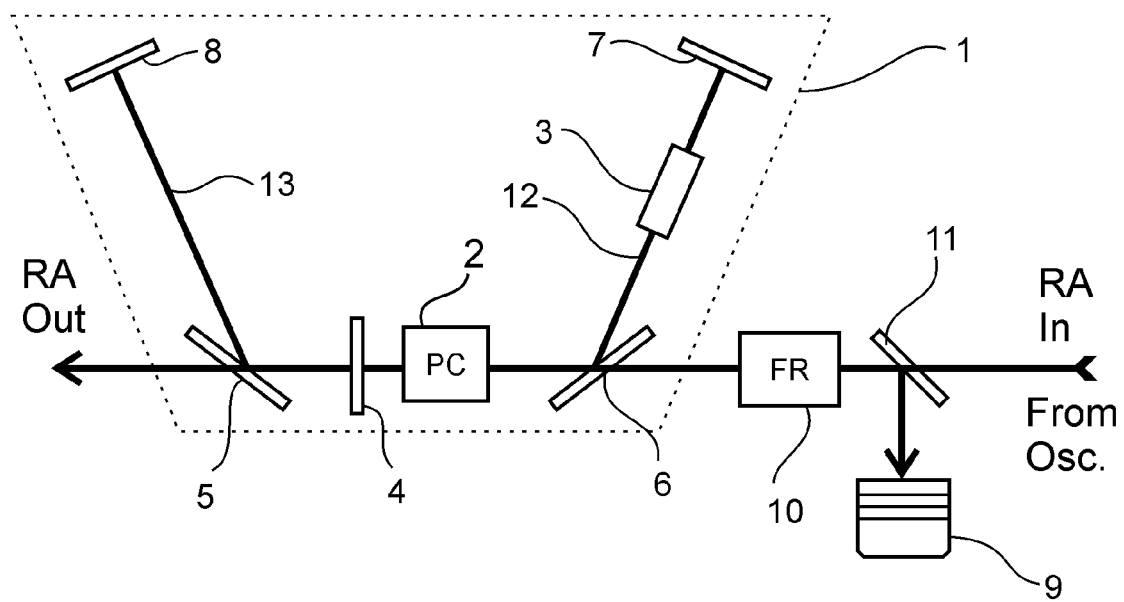
FIG. 1. illustrates the principle of a regenerative amplifier having single electro-optical unit.

In the context of this invention an electro-optical device (2) is any optical unit, capable of changing the polarization state of an incident beam upon actuation by a control signal. Said optical unit can be controlled by application of electric and/or magnetic field, once an electric control signal is switched on. In various applications, single or several non-linear crystals can be arranged in a row in order to reduce switching voltages required, dimensions of each crystal also have significant influence on the switching voltage. In some embodiments, a beam is passed multiple times through a nonlinear crystal used in the Pockels cell, in order to gain multiple changes of polarization. However, the type and configuration of the electro-optical element itself should not be considered as limiting, as far as the unit is capable of changing the polarization state of an incident laser beam. Those skilled in the art can use various configurations of electro-optical devices in order to realize this invention.

For the sake of simplicity, herein and further, the regenerative amplifier is referred to as RA and the electro-optical device is referred to as Pockels Cell (PC), which corresponds to the most appropriate embodiment, in which a Pockels cell element is used together with a polarizer in order to form an electro-optical switch.

In the most preferred embodiment, the regenerative amplifier comprises a single electro-optical device, such as Pockels cell (2), which is located essentially in the middle of the RA optical resonator (1).

In this context, terms 'middle', 'center' or 'centered' are used to describe location of the Pockels Cell (2) such that it is remote from the end mirrors (8, 7) of the cavity and optical path from each of said end mirrors (7, 8) to the Pockels cell (2) is long enough for the Pockels cell to be switched from one state to another state, while a pulse travels the distance from the Pockels cell to the end mirror (7, 8) and back. Typically, switching duration of a Pockels cell is a few or tens of nanoseconds, thus each optical path should be calculated so that an optical pulse propagates therein longer than the switching time of the Pockels cell (2). For example, if the switching time is 6 ns, the optical pulse should take around 10 ns to the end mirror and back. For sake of simplicity, we can divide the RA optical cavity (1) into two parts or optical paths, i.e. first optical path (12) extends to one side of the Pockels cell (2) and extends until the end mirror (7), the second optical path (13) extend to the other side with respect to the Pockels cell (2) and extends until another end mirror (8).

In the most preferred embodiment, the RA (1) further comprises two polarizers (5, 6) arranged on both sides of the PC unit (2). A half-wave plate (4) is located between the first polarizer (5) and the PC unit. It changes the polarization of an incident radiation by 90 degrees. If the half-wave plate is provided, said two polarizers (5, 6) are oriented essentially parallel with respect to each other, meaning that they both reflect either the p polarization of the incident light or the s polarization. Depending on the polarization state of the incident pulse, the first polarizer (5) directs the pulse to the second optical path (13) of the RA cavity (1) or passes the pulse through to the RA output (RA Out). Similarly, the second polarizer (6) reflects the pulse to the first optical path (12) or passes it trough to the input section, however then the pulse polarization state is changed one more time by a polarization rotator (10) and directed towards the beam dump (9) by another polarizer (11) placed in the input section.

Yet in another embodiment, the half-wave plate (4) is not used if polarizers (5, 6) are crossed with respect to each-other.

Yet in another embodiment, a quarter-wave plate is used for polarization rotation. After a single pass of a pulse, the quarter-wave plate turns the polarization state into circular, which is sometimes referred to as 45 degree rotation. If such a wave-plate is used instead of the half-wave plate, the pulse should pass it twice for a 90 degree shift to be carried out. Respectively, the Pockels cell unit should be used in similar way. Such embodiment features an obvious advantage—lower voltage, i.e. a quarter-wave voltage, can be used for the Pockels cell switching.

Yet in another embodiment, second output of the RA is formed instead of the beam dump (9). In such arrangement, the RA has two outputs and the electro-optical switch (2) sorts the amplified pulses and selectively directs them to one or the other output. Such selective operation is achieved by changing the Pockels cell (2) state while an amplified pulse propagates respective optical paths (12, 13):

if the amplified pulse propagates in the first optical path (12), it is directed to the main RA output (RA Out)

if the amplified pulse propagates in the second optical path (13), it is directed towards the RA input section and out-coupled by the third polarizer (11).

Yet in another embodiment, bias voltage may be applied on the Pockels cell, instead of using the waveplate (4).

Switching of the amplified pulses between the two outputs can be referred to as pulse picking. In prior art inventions, pulse picking is performed by an additional Pockels cell unit, which is eliminated in this invention.

Multiple optical designs can be used in order to exploit this invention. For reference, two exemplary optical layouts are described below. Provided examples should not limit the scope of the invention, as those skilled in the art can use the knowledge and common skills to configure the optical cavity differently, but still use the key principle of this invention.

EXAMPLE 1

As illustrated in FIG. 1, in this example of a preferred embodiment, the RA input, the Pockels Cell (2), polarizers (5, 6), the half-wave plate (4) and the RA Out are arranged essentially in a row. For the sake of simplicity, herein and further, the polarization of the input seed pulse train will be referred to as 'p polarization' and a switched polarization, which is essentially perpendicular to the p polarization, will be called 's polarization'.

The first polarizer (5), which is arranged on the output side with respect to the PC unit (2), is oriented such, that it reflects the s polarization. Whenever the PC unit (2) is not activated and is not changing the polarization state of seed pulses coming from the oscillator, the polarization state of the seed pulse is rotated only by the half-wave plate from p to s and then reflected by the first polarizer (5) towards the second optical path (13).

In this exemplary embodiment, when a seed pulse remains unamplified, RA operation comprises following steps:
 I. the seed optical pulse train is injected into the RA cavity via the RA input;
 II. the pulse propagates through the deactivated Pockels cell (2), the polarization remains of p type; and the pulse propagates through the half-wave plate (4), the polarization is rotated from p to s;
 III. the pulse is reflected from the first polarizer (5) to the second optical path (13);
 IV. the pulse propagates in the second optical path (13), reflects from the second end mirror (8);
 V. the returning pulse is reflected from the first polarizer (5) towards the half-wave plate (4) and the Pockels cell (2);
 VI. rotation of the polarization state is present only in the half-wave plate (4) and becomes the same as of the incident beam;
 VII. the pulse is extracted from the RA cavity (1) to the input direction by propagating through the second polarizer (6), the polarization of the pulse is rotated by a Faraday rotator or similar unit;
 VIII. the pulse is reflected by the third polarizer (11) and directed towards a beam dump (9) or a second output.

In case of coupling the pulse in the cavity (1) for amplification, the PC unit is activated whenever, a pulse travels in the second optical path (13). The operational sequence is following:
 I. the seed pulse propagates to the cavity (1) from the RA input;
 II. the pulse propagates through deactivated Pockels cell (2) and the half-wave plate (4), and polarization rotation from p to s is present only in the half-wave plate (4);
 III. the pulse reflects from the first polarizer (5) to the second optical path (13);
 IV. the pulse propagates in the second optical path (13), reflects from the second end mirror (8);
 V. the returning pulse is reflected by the first polarizer (5) towards the half-wave plate (4) and the Pockels cell (2), whereas the PC unit (2) is activated, thus the polarization is rotated twice; the resulting polarization is s;
 VI. the pulse of s polarization is reflected from the second polarizer (6) to the first optical path (12) of the RA cavity (1);
 VII. the pulse propagates through the gain medium (3) and is thus amplified;
 VIII. the pulse reflects from the first end mirror (7) and propagates back into the cavity (1) for another round-trip;
 IX. the PC unit (2) is kept active for as long as the coupled-in pulse is amplified to a desired pulse energy, i.e. it makes several round-trips in the cavity (1);
 X. The amplified pulse is ejected from the RA cavity (1) by removing the actuating signal from the PC unit (2); if the actuating signal is removed while the pulse is propagating in the first optical path (12), the amplified pulse is extracted to the RA output direction; else, if the PC signal is removed while the pulse propagates in the second optical path (13), the amplified pulse is extracted to the RA input direction, i.e. to the beam dump (9) or the second output.

The switching time of the Pockels cell should be shorter than the round-trip of the pulse in the first and the second optical paths (12, 13). Said first optical path (12) preferably comprises a gain medium (3). The gain medium (3) is pumped by a pump unit (not indicated in Figures). It should be noted that the pulse will be released to the output of the RA only if the actuating signal is removed as the amplified pulse propagates in the first optical path (12). After the actuating signal is removed, the amplified pulses' polarization is not affected when the pulse passes the PC unit (2), but the polarization state is changed by the half-wave plate (4). Subsequently, the amplified pulse is transmitted through the first polarizer (5) to the direction of RA output.

It should be noted, that while a seed pulse is coupled-in for amplification, the rest of the seed pulse train is passing through the two polarizers (5, 6), the PC unit (2) and the half-wave plate (4) and is directly extracted to the RA output. This reduces the output contrast, however usually, the pulse energy difference of the amplified pulse and the seed pulse is multiple orders of magnitude, thus the negative impact on the output contrast is minor.

Yet in another embodiment, willing to eliminate seed pulses passing to the main RA output, an additional optical switch is placed at the output. Such optical switch could be an acousto-optical element or another Pockels cell. However this might be needed in exceptional cases, where output contrast really matters.

EXAMPLE 2

Figure 2:
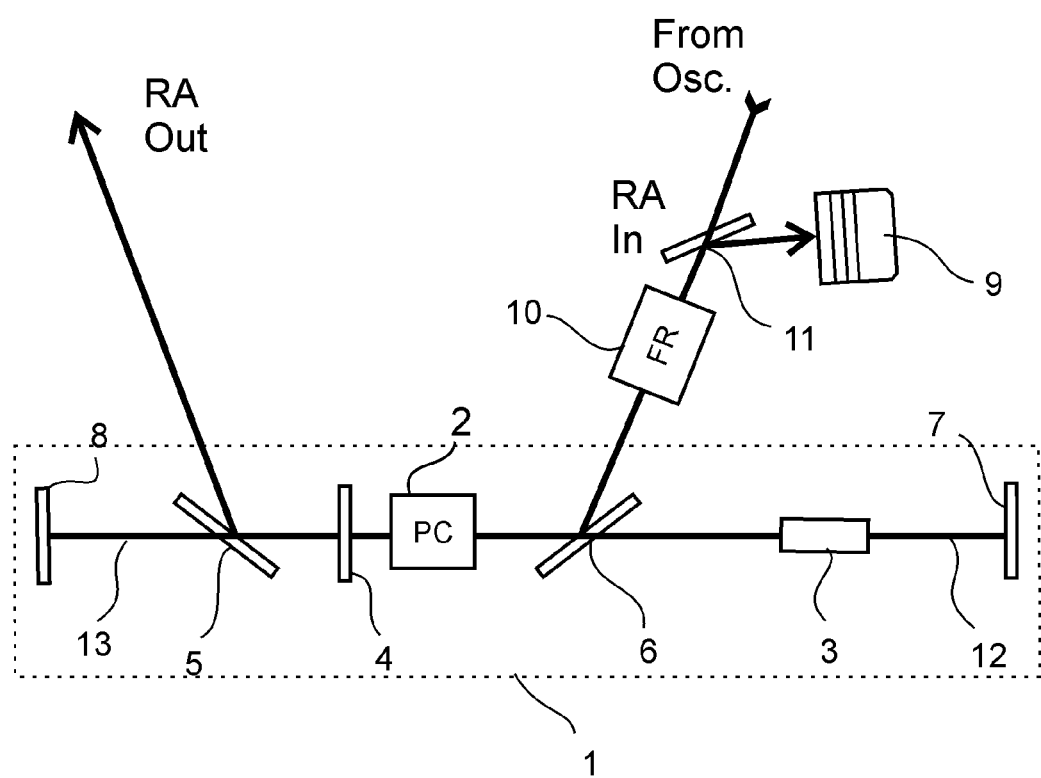
FIG. 2. illustrates another exemplary embodiment of the optical cavity design and geometry.

FIG. 2 illustrates another exemplary embodiment, wherein the RA cavity (1) is essentially of linear geometry. It should be understood that the optical paths (12, 13) can be of significant length and thus it might be required to arrange additional mirrors in said optical paths (12, 13) in order to fold the optical paths and make them more compact. The same is applicable to Example 1 and the optical layout illustrated in FIG. 1. The RA input and output sections are arranged such, that the seed pulses are coupled in the RA cavity (1) and the amplified pulses are out-coupled by reflection from the polarizers (5, 6).

In this exemplary embodiment, when a pulse is amplified, RA operation comprises following steps:
 Additional pulse picker PC unit may be used when extremely high contrast pulses are required
 I. the seed pulse of p polarization reflects from the second polarizer (6) towards the Pockels cell (2);
 II. the polarization state is changed to s only by the half-wave plate (4);
 III. the pulse passes through the first polarizer (5);
 IV. the pulse reflects form the end mirror (8);
 V. the pulse passes though the first polarizer (5);
 VI. the polarization state is changed as the pulse travels through the half-wave plate, the polarization is changed to p;
 VII. the polarization state is changed one more time, as the pulse travels through the Pockels cell (2), which is now activated; the resulting polarization is s;
 VIII. the pulse passes though the second polarizer (6) to the first optical path (12);
 IX. the pulse propagates through the gain medium (3) and thus is amplified;
 X. the pulse makes several round-trips in the RA cavity, between the end mirrors (7, 8), whereas influence of the Pockels cell (2) and the half-wave plate compensate each other out; each time the pulse passes through the gain medium (3), it is amplified;

XI. as the pulse travels in the first optical path (12), the Pockels Cell (2) is deactivated and polarization of the pulse is changed only by the half-wave plate (4), it is further reflected by the first polarizer (5) and extracted to the RA output.

Yet in another embodiment, the PC unit (2) is arranged to change polarization state of an incident beam whenever no actuation signal is applied, thus operation of the PC unit (2) is reverse, as compared to the previous embodiments.

Yet in another embodiment, no half-wave plate is arranged in the optical resonator (1). In such embodiment the polarizers (5, 6) are crossed with respect to each other.

Yet in another embodiment, switching of the PC unit (2) is delayed so that an amplified pulse passes through it during the ramp-up or ramp-down times, i.e. in the state where the Pockels cell (2) is not fully in one or another state of switching. As a consequence, the polarization of the amplified pulse is rotated just partially and just a fraction of such pulse is transmitted or reflected through the first polarizer (5). The remainder of the pulse propagates forth and back the second optical path (13), reflects from the first polarizer (5) and is directed towards the beam dump (9).

Such operational regime allows for fast control over the pulse energy, by maintaining constant gain medium pumping, thus it leads to more stable operation of the Regenerative amplifier.

Yet in another embodiment, the gain medium (3) is arranged in both optical paths (12, 13) in order to achieve higher amplification in a single RA cavity round-trip. Such embodiment provides higher amplification, on the other hand it is more difficult to maintain the pulse-to-pulse stability.

For a person skilled in the art it should be obvious that multiple gain medium crystals can be arranged in any of the optical paths (12, 13) and configuration of gain medium elements should not be considered as limiting the scope of this invention.

The invention claimed is:

1. A regenerative optical amplifier comprising:
   an optical cavity defined by two end mirrors, and
   an electro-optical unit arranged to change a polarization state of an incident beam upon application of an electric signal,
   wherein the electro-optical unit is located essentially in the middle of the optical cavity
   wherein a length of each of a first and a second optical path, extending from the electro-optical unit towards the end mirrors is long enough so that the electro-optical unit is able to fully transition from one state to another while a pulse of light is propagating in either of the first and the second optical paths,
   wherein the regenerative optical amplifier is arranged in such a manner that, depending on a timing of a control signal of the electro-optical unit, amplified pulses are directed out of the regenerative optical amplifier in at least one of a first direction and a second direction, with the first direction being directed away from a first side of the electro-optical unit and the second direction being directed away from a second side of the electro-optical unit, and
   wherein the first side and the second side of the electro-optical unit are substantially opposite to each other.

2. The regenerative optical amplifier according to claim 1, wherein the electro-optical unit comprises a Pockels cell.

3. The regenerative optical amplifier according to claim 1, further comprising a first and a second polarizer, which are each respectively disposed on an opposite side of the electro-optical unit.

4. The regenerative optical amplifier according to claim 3, wherein the first and second polarizers are crossed with respect to each other.

5. The regenerative optical amplifier according to claim 3, wherein the first and second polarizers are parallel with respect to each other, and wherein a half-wave plate is disposed between the electro-optical unit and either of the first and second polarizers.

6. The regenerative optical amplifier according to claim 3, wherein that the first and second polarizers are parallel with respect to each other and a bias voltage is applied to the electro-optical unit.

7. The regenerative optical amplifier according to claim 3, wherein the first polarizer is configured to release an amplified light pulse from the optical cavity and wherein the second polarizer is configured to be used for injection of seed pulses and to release at least one of unamplified seed pulses and amplified waste pulses from the optical cavity to a direction, other than an output direction of the regenerative optical amplifier.

8. The regenerative optical amplifier according to claim 7, wherein a second output is formed for pulses extracted to a direction of seed input, and wherein the regenerative optical amplifier is configured such that pulses are out-coupled by combination of a Faraday rotator and a third polarizer.

9. The regenerative optical amplifier according to claim 1, wherein timing of the electro-optical unit is adjusted such that the pulse propagates through the electro-optical unit during at least one of a ramp-up phase and a ramp-down phase and wherein pulse energy is configured to be reduced by partial transmission through at least one of the first and second polarizers during out-coupling.

10. The regenerative optical amplifier according to claim 1, wherein an additional pulse picker is arranged on at least one of the first side and the second side of the electro-optical unit, and wherein the pulse picker comprises at least one of an electro-optical and an acousto-optical device.

11. A laser apparatus, comprising:
    a laser; and
    a regenerative optical amplifier comprising:
        an optical cavity comprising two end mirrors, and
        an electro-optical unit arranged to change a polarization state of an incident beam upon application of an electric signal,
        wherein the electro-optical unit is located essentially in the middle of the optical cavity,
        wherein a length of each of a first and a second optical path, extending from the electro-optical unit towards the end mirrors is long enough so that the electro-optical unit is able to fully transition from one state to another while a pulse of light is propagating in either of the first and the second optical paths,
        wherein the regenerative optical amplifier is arranged in such a manner that, depending on a timing of a control signal of the electro-optical unit, amplified pulses are directed out of at least one of a first portion of and a second portion of the regenerative optical amplifier,
        wherein the first portion of the regenerative optical amplifier is located on a first side of the electro-optical unit, and wherein the second portion of the regenerative optical amplifier is located on a second side of the electro-optical unit, which is substantially opposite to the first side.

12. The laser apparatus according to claim 11, wherein the laser comprises at least one of a picosecond and a femtosecond pulse laser.

13. The laser apparatus according to claim 11, wherein the laser comprises two outputs.

14. A laser workstation, comprising:
a pulsed laser; and
a regenerative amplifier comprising:
   an optical cavity comprising two end mirrors, and
   an electro-optical unit arranged to change a polarization state of an incident beam upon application of an electric signal,
   wherein the electro-optical unit is located essentially in the middle of the optical cavity,
   wherein a length of each of a first and a second optical path, extending from the electro-optical unit towards the end mirrors is long enough so that the electro-optical unit is able to fully transition from one state to another while a pulse of light is propagating in either of the first and the second optical paths,
   wherein the regenerative optical amplifier is arranged in such a manner that, depending on a timing of a control signal of the electro-optical unit, amplified pulses are directed out of at least one of a first portion of and a second portion of the regenerative optical amplifier,
   wherein the first portion of the regenerative optical amplifier is located on a first side of the electro-optical unit, and
   wherein the second portion of the regenerative optical amplifier is located on a second side of the electro-optical unit, which is substantially opposite to the first side.

15. The laser workstation according to claim 14, wherein the workstation comprises a medical laser.

16. The laser workstation according to claim 14, wherein the workstation comprises a material processing machine.

17. The laser workstation according to claim 14, wherein the workstation comprises a laser spectroscopy system.

18. The regenerative optical amplifier according to claim 2, further comprising a first and a second polarizer, which are each respectively disposed on an opposite side of the electro-optical unit.

19. The regenerative optical amplifier according to claim 8, wherein timing of the electro-optical unit is adjusted such that the pulse propagates through the electro-optical unit during at least one of a ramp-up phase and a ramp-down phase and wherein pulse energy is configured to be reduced by partial transmission through at least one of the first and second polarizers during out-coupling.

20. The regenerative optical amplifier according to claim 9, wherein an additional pulse picker is arranged on at one of the first side and the second side of the electro-optical unit, and wherein the pulse picker comprises at least one of an electro-optical and an acousto-optical device.

\* \* \* \* \*